United States Patent Office 3,213,586
Patented Oct. 26, 1965

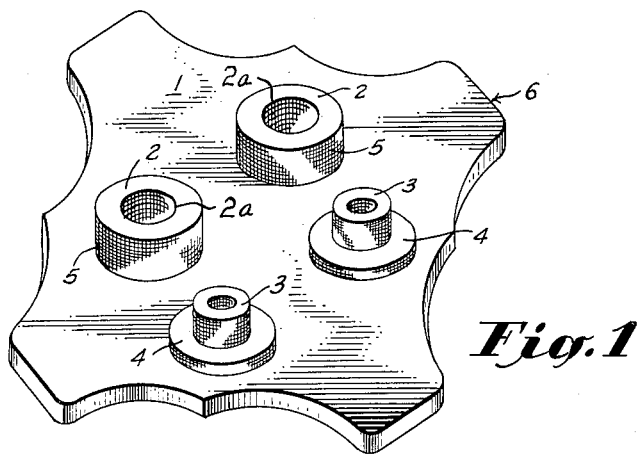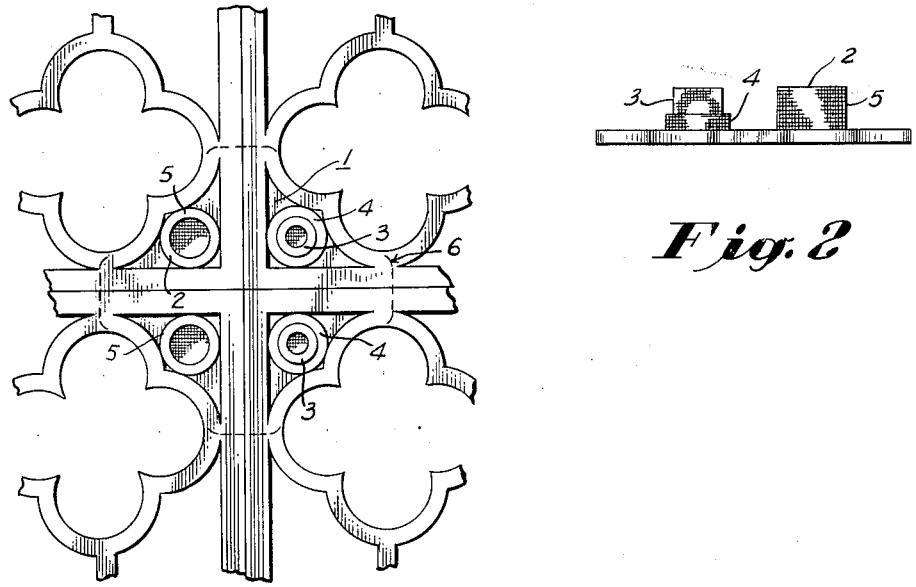
Fig. 1
Fig. 2
Fig. 3
INVENTOR
George Alfred Goodchild

3,213,586
JOINED SCREEN SECTIONS
George Alfred Goodchild, Los Angeles, Calif.
(4058 Del Rey Ave., Venice, Calif.)
Filed May 24, 1961, Ser. No. 112,467
3 Claims. (Cl. 52—581)

My invention relates to a molded plastic decorative screen and more particularly to a screen made up of sections fitted together and secured in a novel manner.

The object of the invention is to provide such a screen in which the sections can be immediately and automatically locked into place.

Other objects are to provide locked screen sections that do not require screws, glue, nails or other time consuming means for securing the sections together; to provide screen sections that do not have to be separately apertured to receive the securing means; to provide plural screen sections that are identical to reduce mold charges; to provide plural fastening means that are also identical to reduce mold charges; and to provide fastening means that may be made of plastic to permit molding of the parts.

These and other objects are accomplished and new results achieved as will become apparent from a consideration of the screen and method of making the same as described in the following specification, particularly pointed out in the claims, and illustrated in the accompanying drawing, in which:

FIG. 1 is a perspective view of the engaging side of one of the members;

FIG. 2 is a fragmentary view of four screen sections joined together with a single fastening member attached to the rear side of the sections ready for attaching the front fastening member thereto; and FIG. 3 is a side elevation of a fastening member.

Each of the fastening members comprise the plastic plate 1, from which extends a female pin 2, a male pin 3, the outside surfaces of which are provided with the same external diameters 4, 5, to form a lineup function.

Each of the screen sections 6 is provided with a grill design having an opening adjacent the corners, through which a lineup pin with outside diameter 4 projects. The outside diameter of the pin is sufficient to provide a snug fit and prevent looseness of the screen sections.

The female pins 2 are provided with sockets 2a to lock over the male pins 3, when the two fastening members are pushed together with a pin from each fastening plate extending through an opening.

In order to obtain a lineup function for the pins, and to permit the two fastening members to be identical, for a junction of four sections, it will be readily apparent that the height of the female pin 2, plus the height of the base of pin 3 having the same diameter 5 as the pin 2, equals the thickness of the screen section to permit the snug fit.

This allows the diameters 4, 5 of both types of pins to be used as a "lineup" for the sections 6 when inserted therein, as is shown in FIG. 2.

Thus the mating fastening member shown in FIG. 3 will automatically fit the screen sections when the two fastening members are pressed together.

The method of manufacturing the screen sections and the fastening members thus allows a single mold for all the sections and a single mold for all the fastening members to form a snugly fitting integral screen.

The method similarly enables the parts to be fitted snugly and to immediately and automatically lock, without threading, nailing, or gluing any of the members.

The fastening members serve a lineup function to maintain the screen sections in a snug fitting planar screen so that the housewife need only press the fastening members together to provide the planar extending screen.

I claim:

1. A screen comprising a plurality of shape retaining abutting decorative screen sections meeting at a common corner lying in the same plane, each screen section having openings at adjacent corners thereof, and a pair of oppositely positioned complementary fastening devices each having a plurality of projecting pins, each pin passing through an opening in a screen section, said projecting pins provided with means contacting the inner surface of the screen openings thereby aligning and snugly fitting the adjacent screen sections together, and means locking the two connecting fastening devices together about the screen sections thereby locking the screen sections together to form a unitary screen.

2. The screen of claim 1, comprising four screen sections joined together by two connecting fastening devices each having four projecting pins, two of which are male and two of which are female.

3. The screen of claim 1 wherein each of the fastening devices are identical and each of the screen sections are identical.

References Cited by the Examiner
UNITED STATES PATENTS

| 298,120 | 5/84 | Roberts | 24—208.1 |
| 1,845,671 | 2/32 | Lotter | 85—5 |
| 2,533,799 | 12/50 | Haydu | 24—213 |
| 2,791,868 | 5/57 | Viken | 46—30 |
| 3,039,574 | 6/62 | Miller | 52—663 |

FOREIGN PATENTS

| 225,037 | 10/59 | Australia. |
| 751,205 | 6/56 | Great Britain. |

FRANK L. ABBOTT, *Primary Examiner.*

RICHARD W. COOKE, Jr., CARL W. TOMLIN,
*Examiners.*